United States Patent [19]
Nelms et al.

[11] Patent Number: 5,864,299
[45] Date of Patent: Jan. 26, 1999

[54] METHOD AND APPARATUS FOR REDUCING OVERHEAD IN A MESSAGING SYSTEM

[75] Inventors: Robert N. Nelms, Boynton Beach; Thomas L. Klein, West Palm Beach, both of Fla.

[73] Assignee: Motorola, Inc., Schaumburg, Ill.

[21] Appl. No.: 743,582

[22] Filed: Nov. 4, 1996

[51] Int. Cl.$^6$ .................................................. H04Q 7/00
[52] U.S. Cl. .................. 340/825.44; 340/825.52; 340/311.1; 370/349; 370/312; 370/474; 455/526; 455/517
[58] Field of Search ............... 340/825.44, 825.47, 340/825.52, 825.07, 311.1, 825.69, 825.26, 825.27; 370/314, 349, 473, 475, 310, 312, 313, 474; 455/31.2, 458, 526, 517

[56] References Cited

U.S. PATENT DOCUMENTS

| | | | |
|---|---|---|---|
| 4,845,491 | 7/1989 | Fascenda et al. | 340/825.44 |
| 5,089,813 | 2/1992 | Deluca et al. | 340/825.44 |
| 5,128,665 | 7/1992 | Deluca et al. | 340/825.47 |
| 5,311,516 | 5/1994 | Kuznicki et al. | 340/825.44 X |
| 5,398,021 | 3/1995 | Moore | 340/825.27 |
| 5,493,282 | 2/1996 | Petreye et al. | 340/825.44 X |
| 5,666,657 | 9/1997 | Kampe et al. | 340/825.44 X |
| 5,686,898 | 11/1997 | Willard et al. | 340/825.44 X |
| 5,694,120 | 12/1997 | Indekeu et al. | 340/825.44 |

FOREIGN PATENT DOCUMENTS

88/09104  11/1988  WIPO .

*Primary Examiner*—Brian Zimmerman
*Assistant Examiner*—William H. Wilson, Jr.
*Attorney, Agent, or Firm*—Eduardo Guntin

[57] ABSTRACT

A messaging system, having a transmitter (202) for transmitting information service messages to selective call units (SCU's) (122), receives displayable information from a service provider, and creates a message having an address field (504) and data field (508). The address field (504) includes an address assigned to at least one SCU (122), and the data field (508) includes the displayable information. A portion of the displayable information is defined as at least one subaddress field (510, 514). The at least one subaddress field (510, 514) is used by the at least one SCU (122), when receiving the message from the messaging system, for determining whether a portion of the displayable information is to be processed.

16 Claims, 5 Drawing Sheets

METHOD AND APPARATUS FOR REDUCING OVERHEAD IN A MESSAGING SYSTEM

FIELD OF THE INVENTION

This invention relates in general to messaging systems transmitting information service messages to selective call units, and particularly to a method and apparatus for reducing overhead of such messages.

BACKGROUND OF THE INVENTION

The popularity of information services has grown significantly throughout recent years. Popular information services include topics such as sports, weather, news, and up-to-date stock market information, just to mention a few.

Messaging systems that transmit over-the-air information service messages, generally transmit these messages to a designated group of selective call units. Each selective call unit in the group is programmed to receive one or more of these services. The messaging systems transmit these messages utilizing either synchronous or asynchronous protocols, such as, for example, the Flex protocol (Flex is a trademark of Motorola, Inc.) or the POCSAG protocol.

A message conforming to one of these protocols generally is composed of an address field and a data field. The address field includes a group address designating the group of selective call units. The data field includes a combination of subaddresses and information service messages. Each subaddress corresponds to a unique information service message topic, e.g. weather.

Each of the selective call units in turn is programmed to detect the arrival of group messages by matching the address field of the message with an address stored in the selective call unit. Once the arrival of a group message is detected, the selective call units proceed to intercept and process the information services included in the data field. This is accomplished by decoding each subaddress in the data field until an information service, in which the selective call unit has been activated to intercept, has been identified. Hence, for each service (e.g., weather, stock, sports, news, etc.) a subaddress is used to delimit the service within the data field.

It is apparent that transmitting information services in this manner suffers from the disadvantage that a significant amount of overhead (i.e., a subaddress for each information service message) is incurred when many services are transmitted in a group message. As the proliferation of short message services increases, the efficiency of bandwidth utilization in the messaging system decreases; therefore, raising the cost of such services to consumers.

What is needed therefore is a method and apparatus for reducing the overhead of transmitting information service messages to selective call units.

DESCRIPTION OF THE PREFERRED EMBODIMENT

Figure 1:
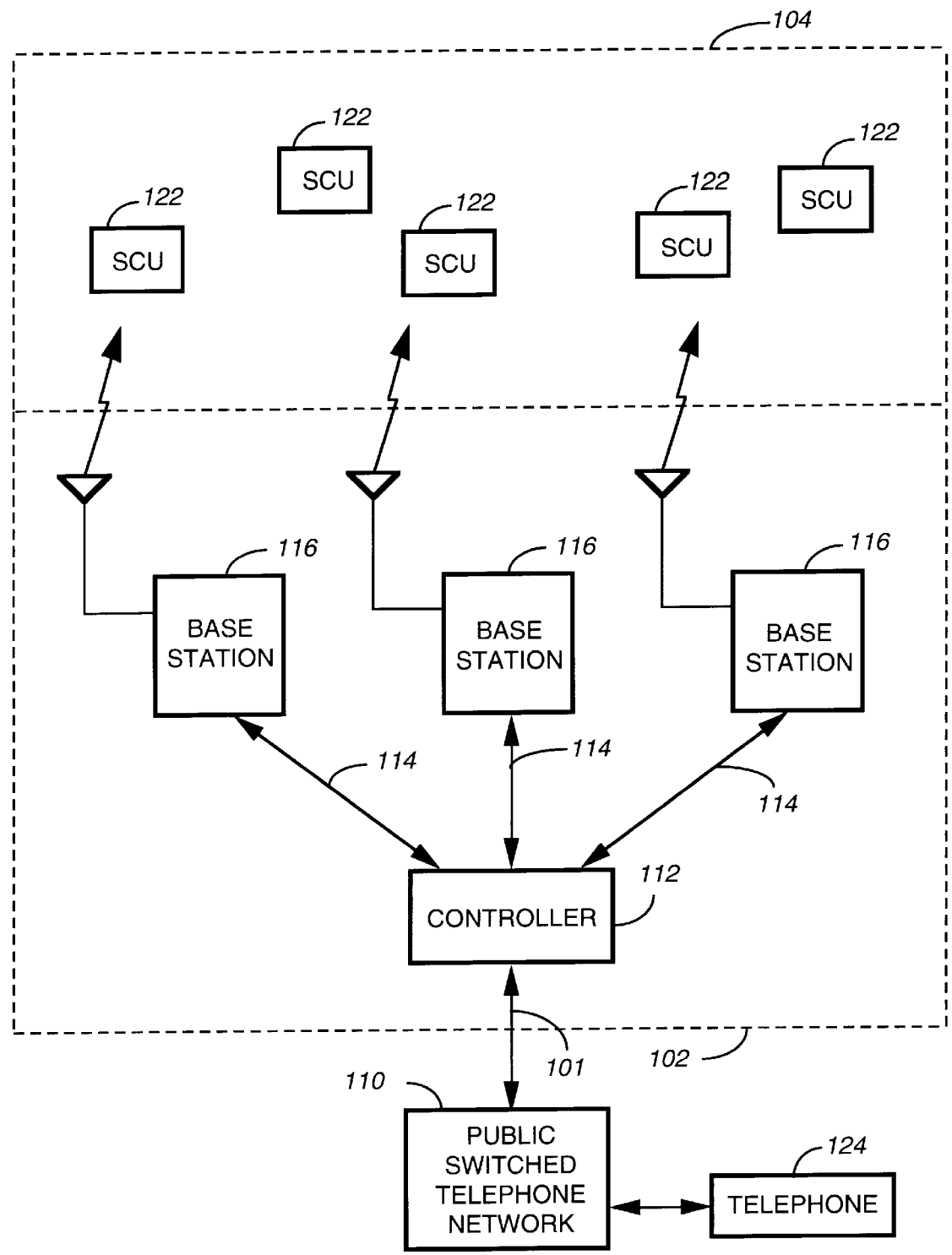
FIG. 1 is an electrical block diagram of a messaging system in which the present invention can be utilized.

FIG. 1 is an electrical block diagram of a one-way radio messaging system in which the present invention can be utilized. It will be appreciated that, alternatively, the present invention can be utilized by a two-way messaging system. For the present illustration, however, a one-way messaging system will be the focus of discussion.

The messaging system of FIG. 1 comprises a fixed portion 102 and a portable portion 104. The fixed portion 102 includes a controller 112 for controlling operation of a plurality of base stations 116 by way of conventional communication links 114, such as microwave links. The portable portion 104 includes a plurality of SCU's (selective call units) 122 for receiving messages transmitted by the base stations 116 under the control of the controller 112.

The controller 112 receives information service messages from service provider 124 communicating with a conventional PSTN (public switch telephone network) 110. The PSTN 110 relays these messages to the controller 112 through a conventional telephone line 101 coupled to the controller 112. Upon receiving messages from the PSTN 110, the controller 112 processes the messages, and delivers them to the base stations 116 for transmission to designated SCU's 122.

Figure 2:
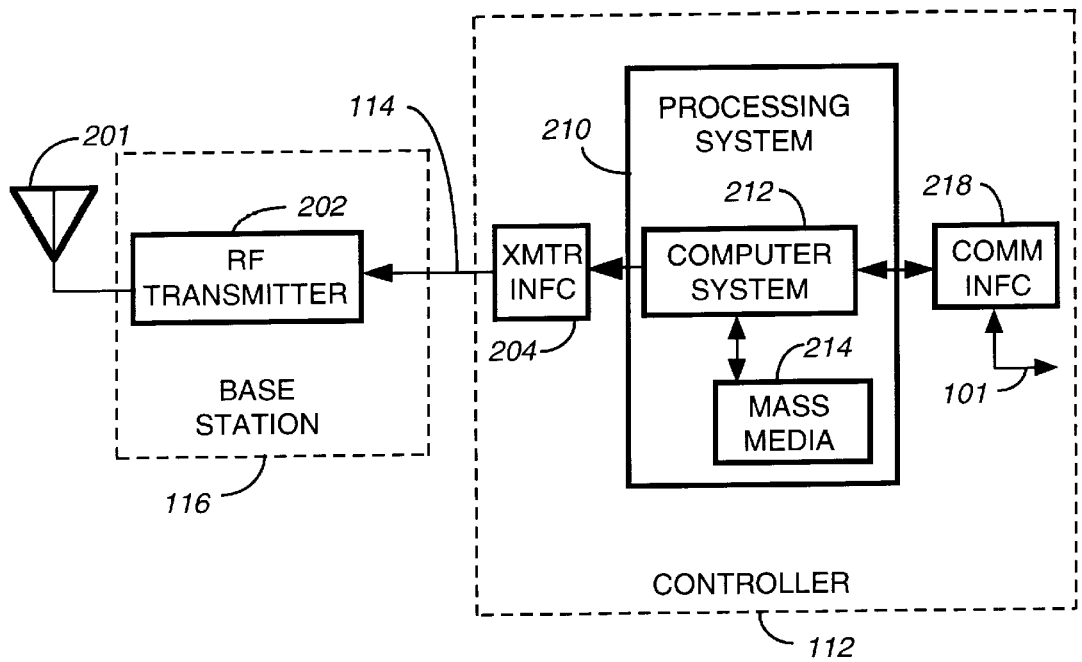
FIGS. 2 and 3 are electrical block diagrams of the fixed portion and the selective call unit of FIG. 1, respectively.
Figure 3:
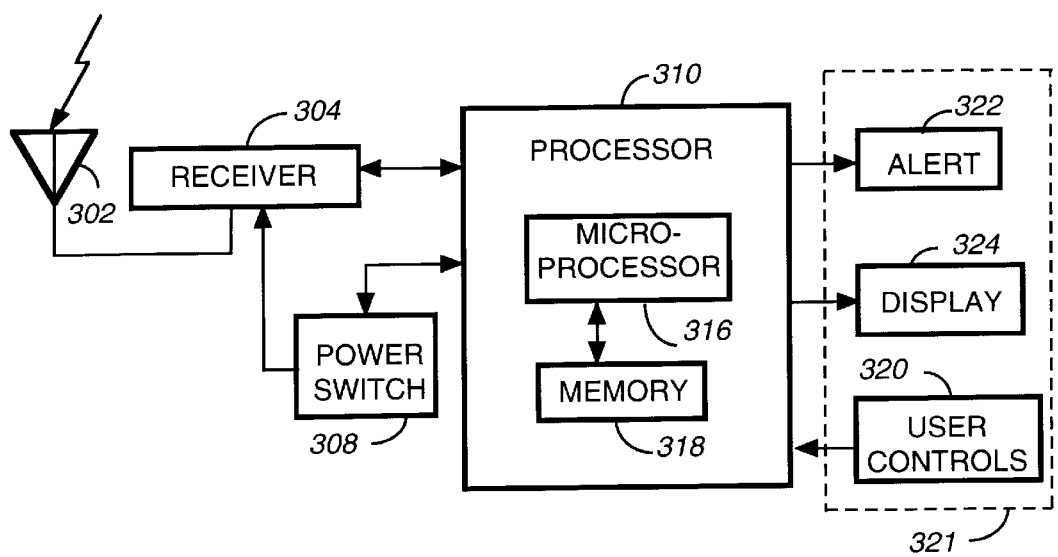

FIGS. 2 and 3 are electrical block diagrams of the fixed portion 102 and the SCU 122 of FIG. 1, respectively. The electrical block diagram of the fixed portion 102 includes the elements of the controller 112 and the base stations 116. The controller 112 comprises a conventional processing system 210 for controlling operation of the base stations 116, a conventional communications interface 218 for receiving messages from the PSTN 110, and a transmitter interface 204 for communicating messages to the base stations 116. The processing system 210 includes conventional hardware such as a computer system 212 and mass media 214 to perform the programmed operations of the controller 112. The base stations 116 comprise a conventional RF transmitter 202 coupled to an antenna 201 for transmitting the messages received from the controller 112.

The SCU 122 comprises a receiver 304 coupled to an antenna 302, a power switch 308, a processor 310, and a user interface 321. The receiver 304 and antenna 302 are conventional RF elements for receiving messages transmitted by the base stations 116. The power switch 308 is a conventional switch, such as a MOS (metal oxide semiconductor) switch for controlling power to the receiver 304 under the direction of the processor 310, thereby providing a battery saving function.

The processor 310 is used for controlling operation of the SCU 122. Generally, its primary function is to decode and process demodulated messages provided by the receiver 304, storing them and alerting a user of the received message. To perform this function, the processor 310 comprises a conventional microprocessor 316 coupled to a conventional memory 318 having nonvolatile and volatile memory portions, such as a ROM (read-only memory) and RAM (random-access memory). One of the uses of the memory 318 is for storing messages received from the base stations 116. Another use is for storing one or more selective call addresses utilized in identifying incoming personal or group messages to be intercepted by the SCU 122.

Once a message has been decoded and stored in the memory 318, the processor 310 activates the alerting device 322 (included in the user interface 321) which generates a tactile and/or audible alert signal to the user. The user interface 321, which further includes, for example, a conventional LCD display 324 and conventional user controls 320, is utilized by the user for processing the received messages. This interface provides options such as reading, deleting, and locking of messages.

To communicate messages to the SCU's 122, the messaging system preferably utilizes a protocol such as the Flex protocol, developed by Motorola, Inc. (Flex is a trademark of Motorola, Inc.) for transmitting synchronous messages. The Flex protocol is a digital selective call signaling protocol that is presently used by various system operators in the United States and in several other countries. It will be appreciated that, alternatively, other signaling protocols that are suitable to the present invention can be used.

Figure 4:
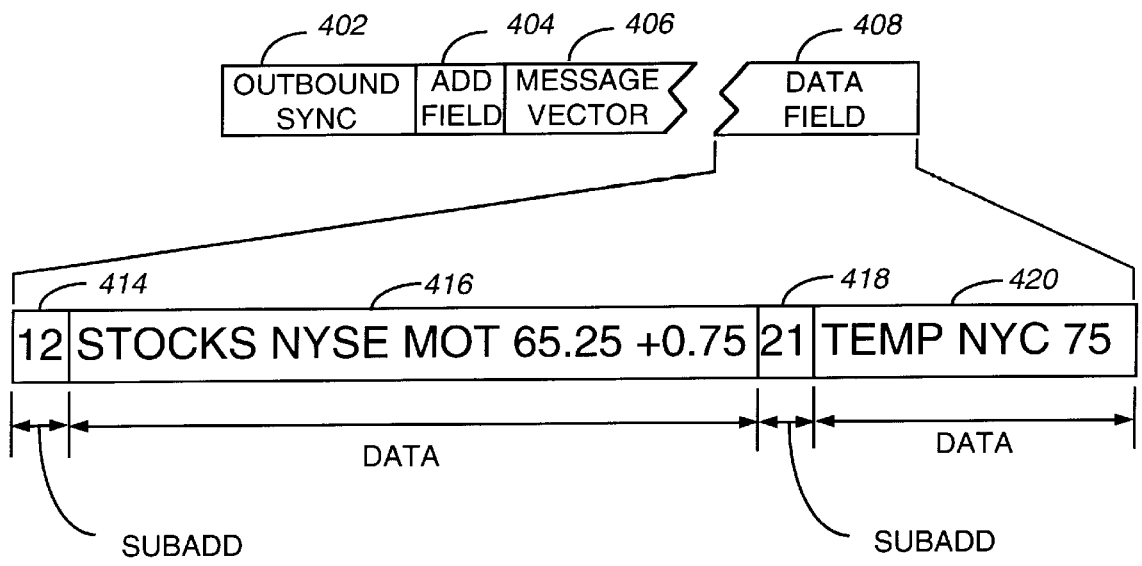
FIG. 4 is an illustration of a communication protocol utilized by a prior art messaging systems.

FIG. 4 is an illustration of a communication protocol 400 utilized by a prior art messaging system. The communication protocol 400 comprises an outbound sync 402, an address field 404, a message vector 406, and a data field 408. The outbound sync 402 provides conventional means for SCU's to synchronize with the communication protocol 400. The address field 404 can include addresses utilized for personal and or group messaging. In the case of personal messaging, a unique address is utilized for transmitting messages to a particular SCU, whereas in group messaging a single address can be utilized for addressing a plurality of SCU's. The message vector 406 points to the position of the data field 408 in the bit stream.

When group messages, comprising information service messages, are transmitted by the prior art messaging system, the data field 408 includes at least one subaddress field, and a corresponding service information 416. In this example, two information service messages are included in the data field 408, thereby requiring two subaddress fields 414, 418.

During group messaging, the subaddress fields 414, 418 are decoded by the group of SCU's to determine whether the information service messages 416, 420 include information which the SCU is subscribed to. If it is not subscribed to either service, then the SCU ignores the information service messages 416, 420. If, on the other hand, an SCU is subscribed to one or both services, then either or both services are intercepted. Note, each service (e.g., weather, stock, sports, news, etc.) includes the overhead of a subaddress field 414, 418 to assist the SCU's in determining which information service messages 416, 420 are to be intercepted.

In this example, the first subaddress field 414 includes the address code "12," which is representative of an information service message 416 that includes stock information, intended to be displayed to a user of an SCU. The message is displayed to a user of an SCU in a manner that identifies it as an information service message 416 including information for STOCKS from the NYSE (New York Stock Exchange), and in particular, a stock quote for MOT (Motorola, Inc.), showing the stock at $65.25, up ¾ of a point. The second subaddress 418 includes the address code "21" representative of an information service message 420 comprising temperature information. The information service message 420 informs one or more users of an SCU that the temperature (TEMP) in New York City (NYC) is 75 degrees. Note that in these examples the subaddress fields 414, 418 are not displayed to users of an SCU.

It becomes apparent that transmitting information service messages in this manner suffers from the disadvantage that a significant amount of overhead (i.e., a subaddress fields 414, 418) is incurred when many services are transmitted in a single group message. As the proliferation of short message services increases in the information service messaging industry, the efficiency of bandwidth utilization in the messaging system is expected to significantly decrease, thereby, raising the cost of such services to consumers.

Figure 5:
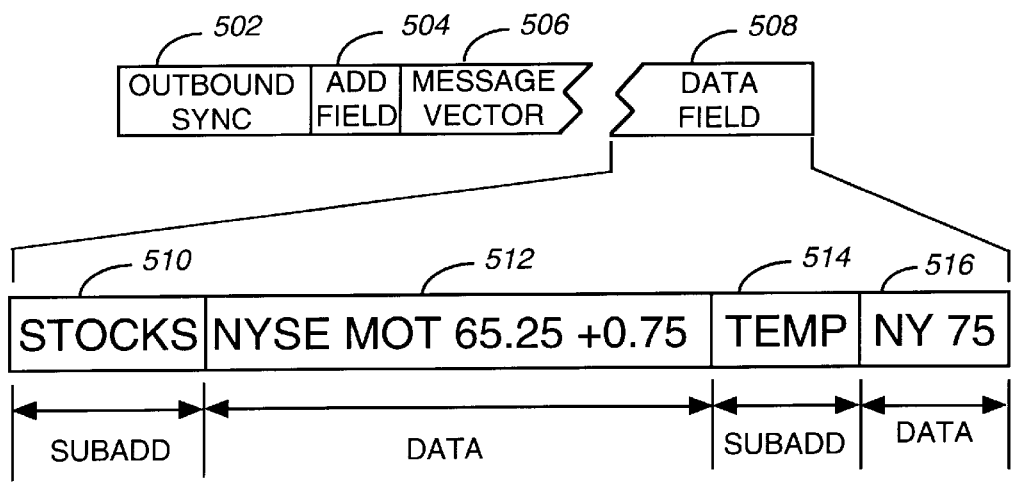
FIG. 5 is an illustration of a communication protocol utilized by a the messaging system of FIG. 1 according to the present invention.

FIG. 5 is an illustration of a communication protocol 500 utilized by the messaging system of FIG. 1 according to the present invention. The communication protocol 500 substantially reduces overhead in transmitting information service messages to SCU, thereby overcoming the disadvantage of the prior art. The communication protocol 500 comprises an outbound sync 502, an address field 504, a message vector 506, and a data field 508. Formatting and operation of the outbound sync 502, the address field 504, and the message vector 506 is substantially similar to the communication protocol 400 discussed above.

In this example, there are two information service messages, similar to the example of FIG. 4. However, the data included in the data field 508 comprises displayable information only, i.e., no additional address codes are utilized. Hence, all of the data included in the data field 508 is information displayable to a user of an SCU 122. In order to distinguish between information service messages, the messaging system of the present invention designates portions of the displayable information (in this example two information service messages) as subaddress fields 510, 514. Hence, the subaddress fields 510, 514 comprise information that is displayable to a user of an SCU 122. The remaining portions of the displayable information (i.e., the remaining portions of the two information service messages) is designated as data 512, 516. This is a distinct difference from the prior art system of FIG. 4.

This method of formatting the data field 508 has the significant advantage over the prior art that the transmission of information service messages incurs no overhead. Hence, the address information included in the subaddress field 510, 514 provides a dual function: (1) it provides selective decoding of subscriber data, and (2) it provides subscriber data displayable to a user of the SCU 122.

In contrast, the prior art messaging system generates unique binary addresses codes for each information service message transmitted with a group message. The unique binary address code is used for selectively decoding each information service message included in the group message. However, once the subaddress is decoded, it is discarded because it no longer provides a user of an SCU useful information. Hence, each subaddress field 414, 418 transmitted by the prior art messaging system adds overhead to the system and decreases the efficiency of bandwidth utilization. The additional overhead generally resulting in higher priced services to the consumer.

Since the subaddress fields 510, 514 of the present invention are utilized by the SCU 122 for selective decoding information service messages, as well as, displaying information service data, transmitting information service messages incurs no additional overhead as encountered by prior art systems. As a result, bandwidth utilization in the messaging system of the present invention is substantially more efficient than prior art systems.

Figure 6:
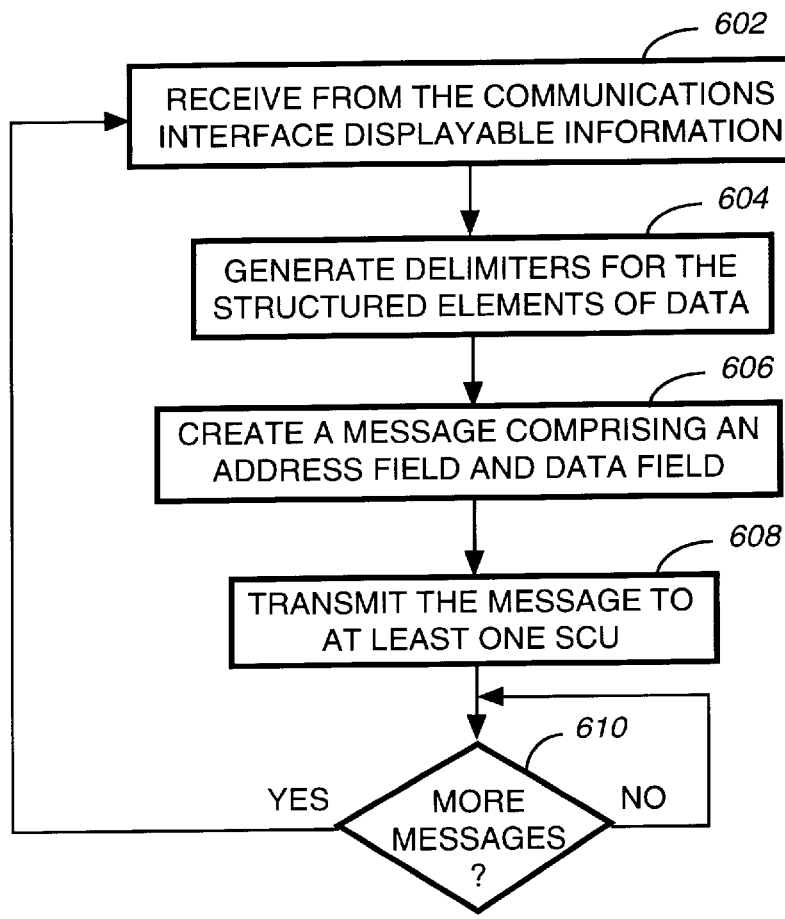
FIG. 6 is a flow chart depicting the operation of the controller of FIG. 1 according to the present invention.

FIG. 6 is a flow chart 600 depicting the operation of the controller 112 of FIG. 1 according to the present invention. The flow chart 600 depicts programmed instructions of the controller 112 which are stored in the mass media 214.

The flow chart 600 begins with step 602 wherein the controller 112 receives from the communications interface 218 displayable information from a service provider. Upon receiving the displayable information, the controller 112 proceeds to step 604 where it generates delimiters for the displayable information. These delimiters will provide the SCU's 122 a method for parsing the service information message, storing it in a structured manner, and presenting it in a manner easily readable by a user of an SCU 122.

In step 606 the controller 112 creates a message comprising an address field 504 and data field 508, the address field 504 including an address assigned to at least one SCU 122 (i.e., group messaging). The data field 508 includes the displayable information and the delimiters as will be shown in FIG. 7. As noted in the discussion of the communication protocol 500 of FIG. 5, a portion of the displayable information and the delimiters is used as at least one subaddress field 510, 514. The subaddress fields 510, 514 are used by the at least one SCU 122 for determining whether the displayable information and the delimiters are to be processed.

Once the message has been created, the controller 112 proceeds to step 608 where it causes one or more transmitters 202 of the base stations 116 to transmit the message to the at least one SCU 122. If there are no more information service messages to be processed, the controller 112 proceeds to a waiting mode in step 610. Otherwise, the controller 112 proceeds to step 602 to process new messages.

Figure 7:
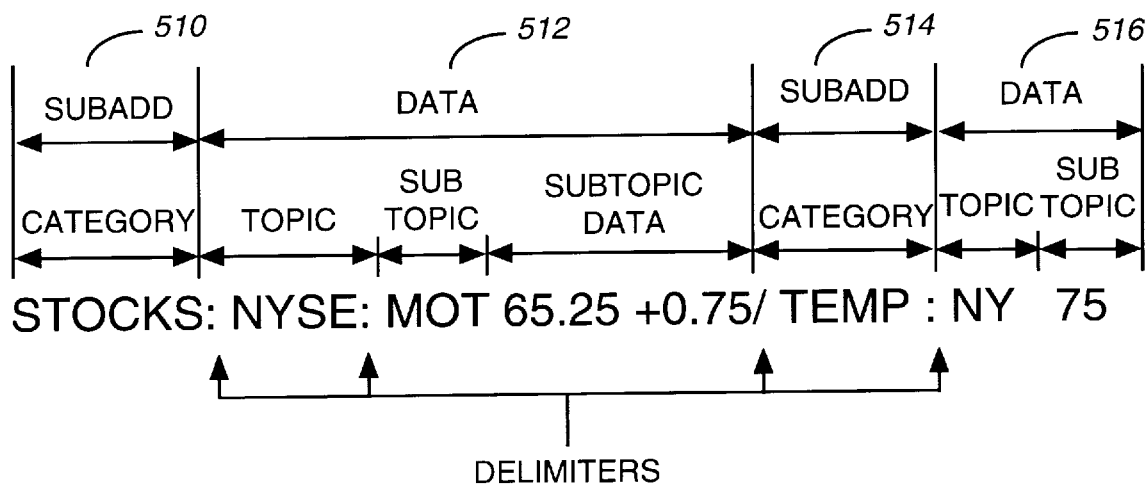
FIG. 7 illustrates how information service messages of FIG. 5 can be delimited according to the present invention.
Figure 8:
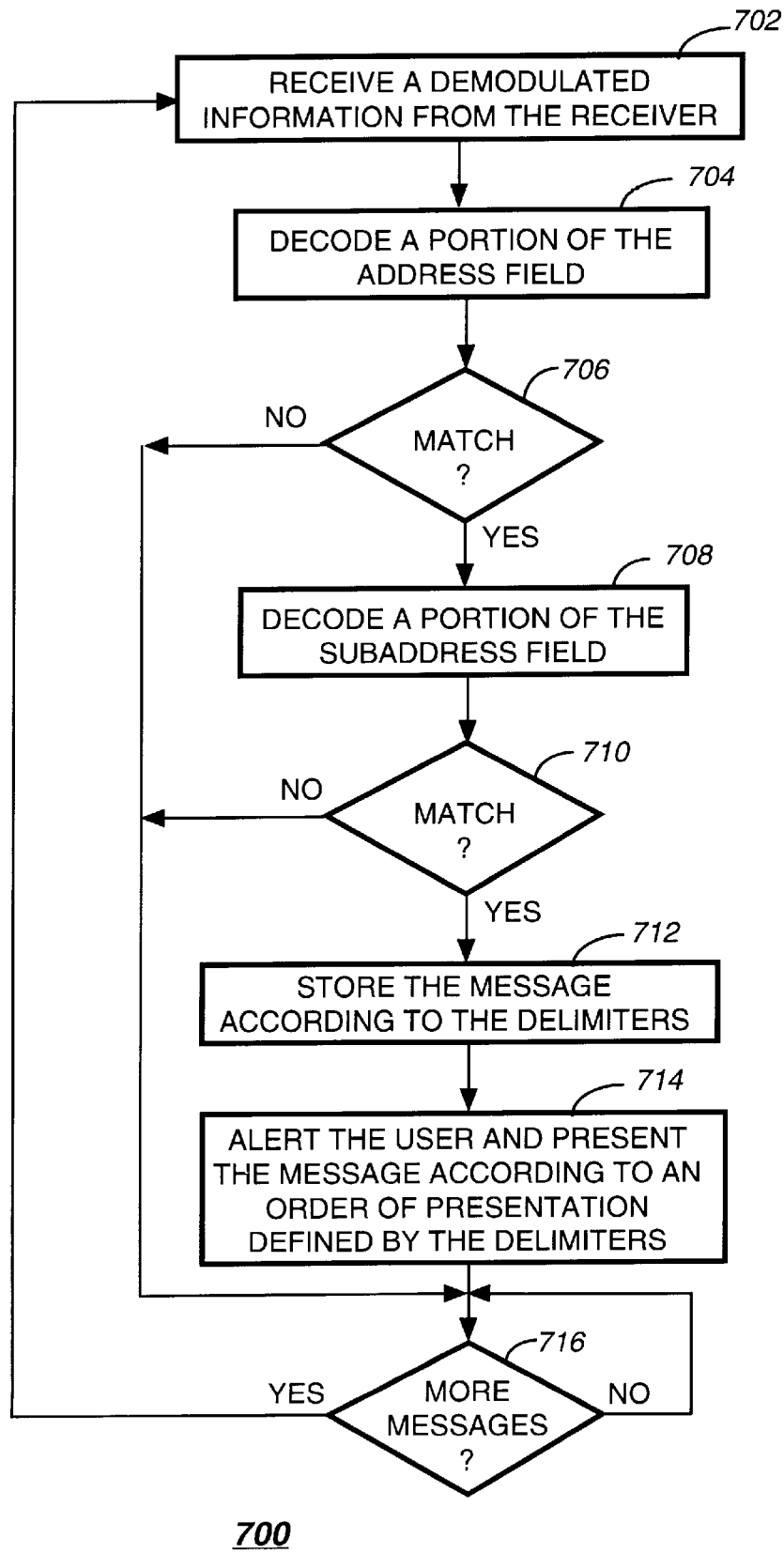
FIG. 8 is a flow chart depicting the operation of the selective call unit of FIG. 1 according to the present invention.

FIG. 7 illustrates how information service messages of FIG. 5 can be delimited according to the present invention. Preferably, the delimiters are selected from a group of delimiters which define a category, a sub-category, a topic, a sub-topic, and a priority level. It will be appreciated that, alternatively, other delimiters suitable to the present invention can be used.

In the present example, only the delimiters for category, topic, topic data, subtopic, and subtopic data are used. FIG. 7 shows the delimiting of information service messages with colons and forward slashes ("/"). It would be appreciated that, alternatively, other delimiting symbols suitable to this invention can be used. In this example, the colons are used to delineate elements of an information service message, such as topics, subtopics, and subtopic data. The forward slashes are used to delimit between information service messages. Hence, the forward slash in this example defines the end and beginning of the first and second information service messages, respectively (i.e., STOCKS, and TEMP).

Alternatively, the information service message can be set off by a first delimiter for defining a priority level of the message. The priority level can be used, for example, to determine the type of alert provided to a user of the SCU 122, the memory location of where the information service message is to be stored, and the manner in which the information service messages is to be presented to the user of the SCU 122.

In yet another embodiment, the information service message, similarly set off by a first delimiter, can be used to defined an alphabetization of the displayable information included in the information service message. This would be accomplished by utilizing a first character of the displayable information (e.g., the first character of the category field) as the first delimiter. The alphabetization can be used, for example, to direct the storage of each information service message in folders alphabetized by the letters "A" through "Z."

It will be also appreciate that, alternatively, the subaddress fields 510, 514 can comprise variable string lengths of the displayable information and delimiters. For example, the subaddress field 510 can be assigned instead a smaller portion of the category string, e.g., "STO." Similarly, a larger portion can be assigned. Hence, the lengths of the subaddress fields 510, 514 are not critical to the present invention.

FIG. 9 is a flow chart depicting the operation of the SCU 122 of FIG. 1 according to the present invention. Flow chart 700 depicts programmed instructions of the SCU 122 which are stored in the memory 318.

The flow chart 700 begins with step 702 where the SCU 122 receives demodulated information corresponding to a message transmitted by the messaging system. The message comprises an address field 504 and a data field 508. The address field 504 includes an address assigned to at least one selective call unit 122, the data field 508 includes displayable information and delimiters as shown in FIG. 7. The delimiters define structured elements of data included in the displayable information. In addition, portions of the displayable information and delimiters are used as subaddress fields 510, 514.

In step 704, the SCU 122 decodes a portion of the address field (using, e.g., partial address correlation) to determine whether a match exists with a first address stored in the memory 318. If a match is not detected in step 706, the SCU 122 proceeds to step 716 to await more group messages. If a match is detected, the SCU 122 proceeds to step 708 where it decodes a portion of the at least one subaddress field 510 (again using, e.g., partial address correlation) to determine whether a match exists with a second address stored in the memory 318. If a match is not detected in step 710, the SCU 122 awaits decoding of other subaddress fields 514. If after exhaustively decoding all the subaddress fields 510, 514 a match is not detected, the SCU 122 proceeds to step 716 to await more group messages. In the case where a single information service message is included in the group message, the SCU 122 proceeds directly to step 716.

If, on the other hand, a match is detected, the SCU 122 proceeds to step 712 where it stores in the memory 318 the displayable information according to an order defined by the delimiters. In step 714 the SCU 122 alerts the user and presents the displayable information by way of the user interface 321 according to the order defined by the delimiters. The SCU 122 then proceeds to step 716 to await the arrival of more group messages.

In sum, the present invention provides an advantageous method for reducing overhead of transmitting information service messages over the prior art. To accomplish this, the subaddress fields are utilized as part of the displayable information. Hence, the general overhead incurred by prior art systems, i.e., sending a unique address for identifying information services is completely eliminated. The result is a substantial improvement of the efficiency of bandwidth utilization over prior art systems.

What is claimed is:

1. In a messaging system having a transmitter for transmitting information service messages to selective call units, a method for reducing overhead of the information service messages, the method comprising the steps of:

receiving displayable information from a service provider;

creating a message comprising an address field and data field, the address field including an address assigned to at least one selective call unit, the data field including the displayable information,
   wherein a portion of the displayable information is used as at least one subaddress field by the at least one selective call unit for determining whether a portion of the displayable information is to be processed, and
   wherein upon receiving the message at the at least one selective call unit and determining that the message is to be processed, the at least one selective call unit is directed to display to a corresponding user of the at least one selective call unit the displayable information including the portion of the displayable information used as the at least one subaddress field; and
transmitting the message to the at least one selective call unit.

2. The method as recited in claim 1, further comprising the steps of:
   generating delimiters for the displayable information; and
   inserting the delimiters and the displayable information into the data field of the message.

3. The method as recited in claim 2, wherein a first delimiter included with the displayable information defines a priority level.

4. The method as recited in claim 2, wherein a first delimiter included with the displayable information defines an alphabetization of the displayable information, the first delimiter corresponding to a first character of the displayable information.

5. The method as recited in claim 2, wherein the delimiters are selected from a group of delimiters which define a category, a subcategory, a topic, a subtopic, and a priority level.

6. In a messaging system having a transmitter for transmitting information service messages to selective call units, a method for reducing overhead of the information service messages, the method comprising the steps of:
   receiving displayable information from a service provider;
   generating delimiters for the displayable information;
   creating a message comprising an address field and data field, the address field including an address assigned to at least one selective call unit, the data field including the displayable information and the delimiters,
      wherein a portion of the displayable information and the delimiters are used as at least one subaddress field by the at least one selective call unit for determining whether a portion the displayable information and the delimiters are to be processed, and
      wherein upon receiving the message at the at least one selective call unit and determining that the message is to be processed, the at least one selective call unit is directed to display to a corresponding user of the at least one selective call unit the displayable information including the portion of the displayable information used as the at least one subaddress field; and
   transmitting the message to the at least one selective call unit.

7. In a selective call unit receiving information service messages from a messaging system, a method for decoding the information service messages, the method comprising the steps of:
   receiving a message from the messaging system comprising an address field and a data field, the address field including an address assigned to at least one selective call unit, the data field including displayable information, wherein a portion of the displayable information is defined as at least one subaddress field;
   decoding a portion of the address field to determine whether a match exists with a first address stored in the selective call unit;
   upon detecting a match with the first address, decoding a portion of the at least one subaddress field to determine whether a match exists with a second address stored in the selective call unit; and
   upon detecting a match with the second address, presenting the displayable information including the portion of the displayable information used as the at least one subaddress field to a user of the selective call unit.

8. The method as recited in claim 7, the data field further including delimiters for defining an order to the displayable information.

9. The method as recited in claim 8, wherein the delimiters correspond to a group of delimiters defining a category, a subcategory, a topic, a subtopic, and a priority level.

10. The method as recited in claim 8, the selective call unit further including the step of storing the displayable information according to the order defined by the delimiters.

11. The method as recited in claim 8, wherein the presenting step the displayable information is displayed by the selective call unit according to the order defined by the delimiters.

12. In a selective call unit receiving information service messages from a messaging system, a method for decoding the information service messages, the method comprising the steps of:
   receiving a message from the messaging system comprising an address field and a data field, the address field including an address assigned to at least one selective call unit, the data field including displayable information and delimiters, the delimiters defining an order to the displayable information, wherein a portion of the displayable information is defined as at least one subaddress field;
   decoding a portion of the address field to determine whether a match exists with a first address stored in the selective call unit;
   upon detecting a match with the first address, decoding a portion of the at least one subaddress field to determine whether a match exists with a second address stored in the selective call unit; and
   upon detecting a match with the second address,
      storing the displayable information according to the order defined by the delimiters, and
      presenting the displayable information including the portion of the displayable information used as the at least one subaddress field according to the order defined by the delimiters.

13. A messaging system for transmitting information service messages to selective call units, comprising:
   a communications interface coupled to a service provider;
   a transmitter; and
   a controller coupled to the communications interface and coupled to the transmitter,
   the controller programmed to:
      receive from the communications interface displayable information from the service provider;
      create a message comprising an address field and data field, the address field including an address assigned to at least one selective call unit, the data field including the displayable information, wherein a portion of the displayable information is used as at least one subaddress field by the at least one selective call unit for determining whether a portion of the displayable information is to be processed, and wherein upon receiving the message at the at least one selective call unit and determining that the message is to be processed, the at least one selective call unit is directed to display to a corresponding user of the at least one selective call unit the displayable information including the portion of the displayable information used as the at least one subaddress field; and cause the transmitter to transmit the message to the at least one selective call unit.

14. A messaging system for transmitting information service messages to selective call units, comprising:

a communications interface coupled to a service provider;

a transmitter; and a controller coupled to the communications interface and coupled to the transmitter, the controller programmed to:
receive from the communications interface displayable information from a service provider;
generate delimiters for the displayable information;
create a message comprising an address field and data field, the address field including an address assigned to at least one selective call unit, the data field including the displayable information and the delimiters, wherein a portion of the displayable information and the delimiters are used as at least one subaddress field by the at least one selective call unit for determining whether a portion the displayable information and the delimiters are to be processed, and wherein upon receiving the message at the at least one selective call unit and determining that the message is to be processed, the at least one selective call unit is directed to display to a corresponding user of the at least one selective call unit the displayable information including the portion of the displayable information used as the at least one subaddress field; and cause the transmitter to transmit the message to the at least one selective call unit.

15. A selective call unit for receiving information service messages from a messaging system, comprising:

a receiver;

a user interface; and a processor coupled to the receiver and coupled to the user interface, the processor programmed to:
receive demodulated information from the receiver corresponding to a message transmitted by the messaging system comprising an address field and a data field, the address field including an address assigned to at least one selective call unit, the data field including displayable information, wherein a portion of the displayable information is defined as at least one subaddress field;

decode a portion of the address field to determine whether a match exists with a first address stored in the selective call unit;

decode a portion of the at least one subaddress field, upon detecting a match with the first address, to determine whether a match exists with a second address stored in the selective call unit; and upon detecting a match with the second address, present the displayable information including the portion of the displayable information used as the at least one subaddress field to a user of the selective call unit by way of the user interface.

16. A selective call unit for receiving information service messages from a messaging system, comprising:

a receiver;

a memory;

a user interface; and a processor coupled to the receiver and coupled to the memory and coupled to the user interface, the processor programmed to:
receive demodulated information from the receiver corresponding to a message transmitted by the messaging system comprising an address field and a data field, the address field including an address assigned to at least one selective call unit, the data field including displayable information and delimiters, the delimiters defining an order to the displayable information, wherein a portion of the displayable information is defined as at least one subaddress field;

decode a portion of the address field to determine whether a match exists with a first address stored in the memory;

decode a portion of the at least one subaddress field, upon detecting a match with the first address, to determine whether a match exists with a second address stored in the memory; and upon detecting a match with the second address,
store in the memory the displayable information according to the order defined by the delimiters, and
present the displayable information including the portion of the displayable information used as the at least one subaddress field by way of the user interface according to the order defined by the delimiters.

* * * * *